United States Patent
Takeda et al.

(10) Patent No.: US 6,754,154 B1
(45) Date of Patent: Jun. 22, 2004

(54) OPTICAL DISK DRIVING APPARATUS, OPTICAL DISK DRIVING METHOD AND OPTICAL DISK APPARATUS

(75) Inventors: Ryuji Takeda, Tokyo (JP); Seiichiro Oishi, Tokyo (JP); Tetsuhiro Shiomi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/498,383

(22) Filed: Feb. 3, 2000

(30) Foreign Application Priority Data

Feb. 5, 1999 (JP) .......................................... 11-028934

(51) Int. Cl.$^7$ .............................................. G11B 7/095
(52) U.S. Cl. ............................... 369/53.19; 369/44.32; 369/53.34; 369/53.37; 318/696
(58) Field of Search .......................... 369/44.32, 53.19, 369/53.34, 53.37; 318/696

(56) References Cited

U.S. PATENT DOCUMENTS

| | | | |
|---|---|---|---|
| 3,986,094 A | * 10/1976 | Quioque et al. | ............ 318/696 |
| 4,137,777 A | * 2/1979 | Haverl et al. | ................. 73/620 |
| 5,001,690 A | * 3/1991 | Kamiya et al. | .......... 369/44.32 |
| 5,107,478 A | * 4/1992 | Tamaru et al. | .......... 369/44.32 |
| 5,206,848 A | * 4/1993 | Kusano et al. | .......... 369/44.41 |
| 5,598,207 A | * 1/1997 | Kormos et al. | ............. 348/148 |
| 5,625,269 A | * 4/1997 | Ikeda | .......................... 318/696 |
| 5,708,646 A | * 1/1998 | Furusawa | .................... 369/112 |
| 5,777,960 A | * 7/1998 | Ohno | ....................... 369/44.14 |
| 5,859,818 A | * 1/1999 | Tateishi et al. | .......... 369/44.32 |
| 6,282,161 B1 | * 8/2001 | Son et al. | ................ 369/53.19 |
| 6,418,104 B1 | * 7/2002 | Sato et al. | ............... 369/53.19 |

FOREIGN PATENT DOCUMENTS

| | | | | |
|---|---|---|---|---|
| EP | | 443822 A2 * | 8/1991 | ............ G11B/7/09 |
| WO | wo 97/26651 | | * 7/1997 | ............ G11B/7/09 |

* cited by examiner

*Primary Examiner*—Gautam R. Patel
(74) *Attorney, Agent, or Firm*—Frommer Lawrence & Haug LLP; William S. Frommer; Dennis M. Smid

(57) ABSTRACT

The object of the present invention is to propose an optical disk driving apparatus, an optical disk driving method and an optical disk apparatus capable of reducing the occurrence of disturbance to focus servo control and tracking servo control. In the optical disk driving apparatus, a tilt driving section (27) is provided with waveform shaping unit for shaping a driving current waveform driving a tilt motor (28) for changing the angle of an optical pickup (3) with respect to the rotating surface of an optical disk. Thus, it is possible to prevent the vibration of the optical pickup (3), to reduce disturbance derived from the vibration of an objective lens (8) to focus control and tracking control and to suppress mechanical noise while tilt driving is being performed. Besides, since there is no need to provide a tilt sensor, the optical pickup (3) can be made small in size and therefore, the smaller-sized optical disk driving apparatus can be provided.

8 Claims, 11 Drawing Sheets

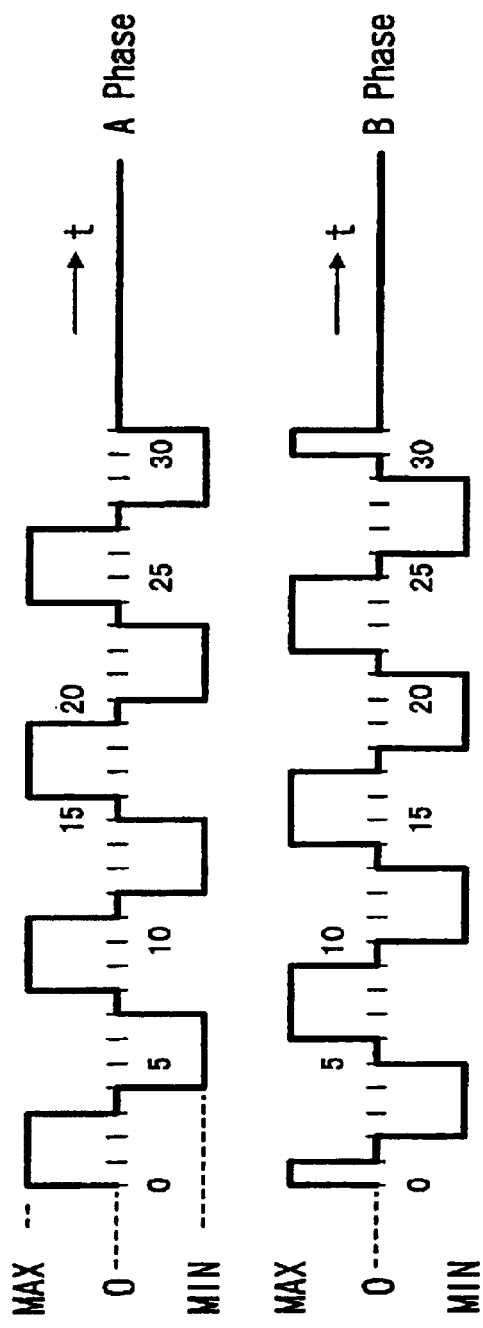

F I G. 10
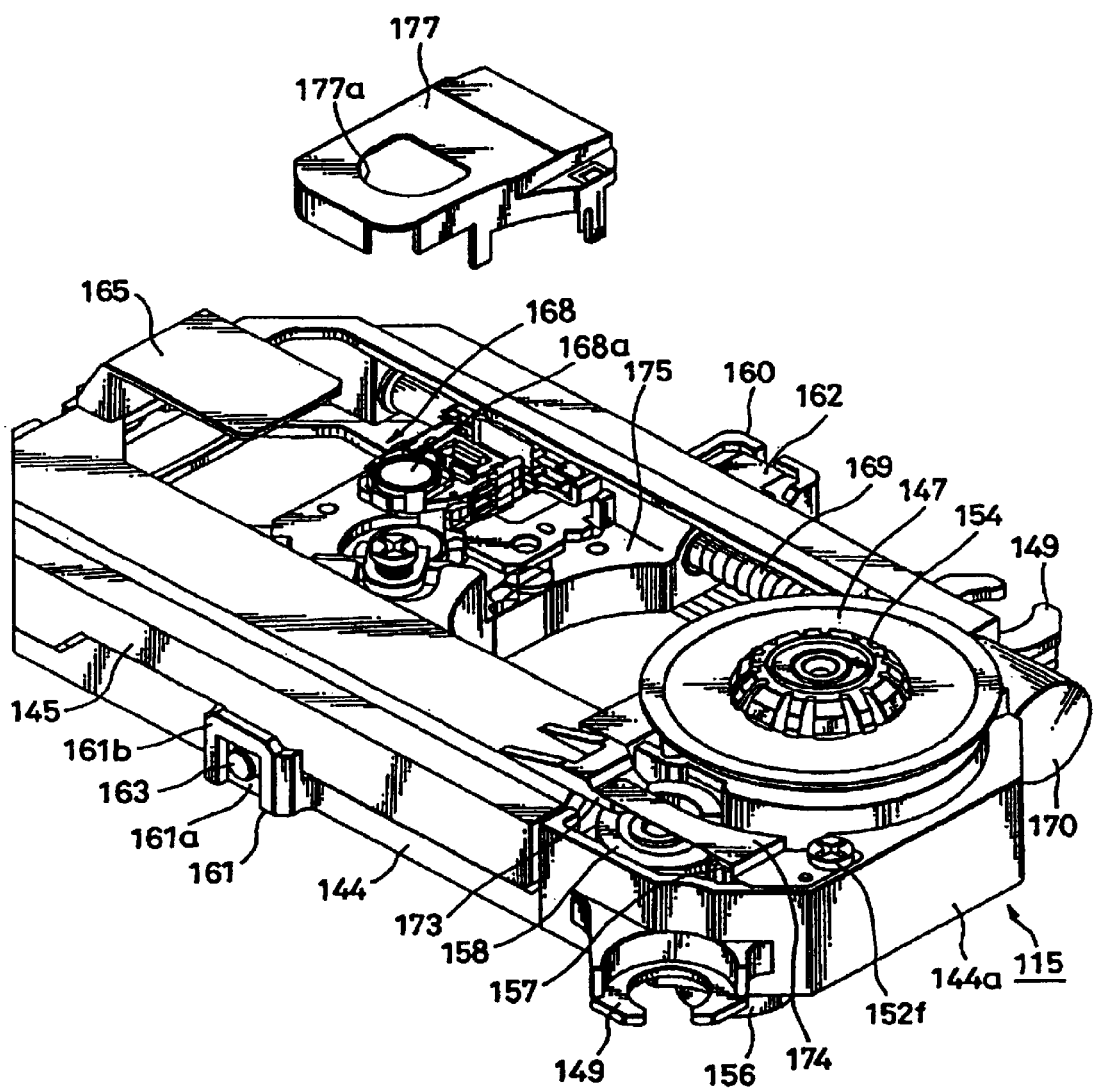

OPTICAL DISK DRIVING APPARATUS, OPTICAL DISK DRIVING METHOD AND OPTICAL DISK APPARATUS

BACKGROUND OF THE INVENTION

1. Field of the Invention

The present invention relates to an optical disk driving apparatus, an optical disk driving method and an optical disk apparatus. The present invention can be applied to the adjustment of a disk tilt in case of recording or reproducing information recorded on, for example, an optical disk (MO), a compact disk (CD), a compact disk recordable (CD-R) or a digital video disk (DVD) serving as a disk-shaped recording medium.

2. Description of the Related Art

In the present optical disk field, there exist optical disks of not only the conventional CD format but also various formats such as a compact disk recordable (CD-R) coated with a color film of organic color, a magnetic disk (MO), a phase change optical disk (DVD-RAM).

A recording and reproducing apparatus for such optical disks controls a radial tilt angle indicating the radial gradient of an optical disk with respect to a light spot applied from an optical pickup. As recording density increases, demand for accurately detecting the radial tilt (radial warp) of an optical disk, controlling the radial tilt of the optical disk and thereby ensuring reliability, rises.

To satisfy the demand, the development of an optical disk recording and reproducing apparatus having a tilt mechanism for automatically adjusting the tilt of an optical pickup to accurately read a reproduction signal installed therein is underway. If the radial tilt of an optical disk is to be detected in the optical disk recording and reproducing apparatus of this type, a tilt sensor utilizing, for example, a reflection type sensor is mounted on an optical pickup and the sensor detects a radial tilt based on the difference in the quantity of reflected light when the optical pickup is moved in the radial direction of the optical disk. Then, the tilt mechanism using a DC motor is employed to control the tilt of the optical disk so as to minimize an error signal caused by the tilt of the optical disk from the tilt sensor.

There is also developed an optical disk apparatus which does not include a tilt sensor, processes a readout signal of an optical pickup and controls the tilt of the optical disk.

Japanese Patent Unexamined Application Publication No. 8-255360 discloses an optical disk apparatus for detecting a reflected light from an optical disk by means of two photo-detector elements to generate a difference signal, sensing an envelope of the detection signal to thereby detect differential components and conducting tracking control based on the differences to thereby remove DC offset.

Japanese Patent Unexamined Application Publication No. 9-212891 discloses an optical head apparatus which divides a laser light into a main light flux and a sub-light flux, individually generates push-pull signals from these light fluxes and generates a tilt signal corresponding to a disk tilt from these push-pull signals. Further, Japanese Patent Unexamined Application Publication No. 9-245357 discloses a servo control apparatus for an optical disk recording and reproducing apparatus, which apparatus converts a push-pull signal and a phase difference detection signal into a de-tracking signal and a radial tilt signal and controls a tracking servo and a thread servo.

FIG. 12 shows a conventional disk drive mechanism having a tilt mechanism using a tilt sensor.

In FIG. 12, the disk drive mechanism comprises a spindle chassis 202 made of a plate frame having an opening portion of generally rectangular shape provided therein, a pickup chassis 203 made of a plate frame which is slightly smaller than the spindle chassis 202 and which has an opening portion provided therein, and a tilt operation mechanism 204 rocking the pickup chassis 203 relative to the spindle chassis 202 based on the rotating force of a motor. The pickup chassis 203 is provided with a pair of shaft portions 203a protruding to both sides of the chassis 203 in width direction. The spindle chassis 202 is provided with a pair of bearing portions 202a rotatably supporting the shaft portions 203a. The combination of the paired bearings 202a and the paired shafts 203a supports the pickup chassis 203 to be rockable to the spindle chassis 202 in longitudinal direction.

The tilt operation mechanism 204 is provided on one longitudinal side of the spindle chassis 202. When the tilt operation mechanism 204 operates, the pickup chassis 203 rocks in the longitudinal direction of the spindle chassis 202. A spindle motor 205 is fixed to the other longitudinal side of the spindle chassis 202 in a state in which the rotary shaft of the motor 205 is directed upward. A turn table 206 onto which an optical disk is installed is attached integrally with the rotary shaft of the spindle motor 205.

Further, a guide shaft 203b and a guide portion which is not shown in FIG. 12 are attached parallel to the pickup chassis 203 at a predetermined distance between the guide shaft 203b and the guide portion to extend longitudinally. The slide member 208 of an optical pickup unit 207 is slidably supported by the guide shaft 203b and the guide portion. A rack which is not shown in FIG. 12 is fixed to the slide member 208. A gear positioned at the distal end portion of a head feed mechanism 209 is engaged with the rack. By driving the head feed mechanism 209 and transmitting the rotating force of the mechanism 209 to the slide member 208, the optical pickup unit 207 is moved to approach and separate from the turn table 206.

A tilt sensor 210 which detects a distance to the information recording surface of the optical disk installed onto the turn table 206, is mounted on the slide member 208. The tilt sensor 210 emits a light toward the information recording surface and detects the warp of the optical disk reflected by the information recording surface. Based on the detection result of the tilt sensor 210, the tilt operation mechanism 204 controls the optical disk so as to minimize an error signal caused by the warp of the optical disk. By doing so, the tilt of the pickup chassis 203 is modified and the tilt of the optical axis of the optical head 207a of the optical pickup unit 207 with respect to the tilt of the information recording surface of the optical disk can be adjusted. If the tilt sensor 210 is used, the mechanism 204 controls the optical disk so as to minimize an error signal from the tilt sensor 210 which signal is caused by the tilt of the optical disk. Thus, there is no need to know a tilt operation neutral point (mechanical center which will be referred to as "mecha-center" hereinafter).

In the above-stated conventional optical disk recording and reproducing apparatus utilizing the tilt sensor, the tilt sensor and a DC motor for tilt operation are mounted on the optical pickup. Due to this, the conventional optical disk recording and reproducing apparatus has disadvantages in that production cost is pushed up and the optical pickup becomes larger in size.

Moreover, in an optical disk apparatus which does not include a tilt sensor and conducts tilt control by processing the readout signal of an optical pickup, when an optical disk for initiating the rotation of a spindle motor, is started, a reproduction signal cannot be read yet. Due to this, the quantity of the warp of the optical disk is not known and the optical disk is, therefore, required to be positioned at the tilt operation neutral point as the mecha-center in advance. If so, a sensor capable of obtaining the tilt operation neutral point is required. Besides, since a tilt operation angle is about ± one degree, the apparatus is disadvantageously required to have higher sensor attachment accuracy.

In addition, in the conventional disk drive mechanism having the tilt mechanism utilizing the tilt sensor shown in FIG. 12, the DC motor is used as a driving source of the tilt operation mechanism. The DC motor may be replaced by a stepping motor capable of conducting positioning control easily. The stepping motor is a kind of a synchronous motor. A magnetic field is continuously rotated by inputting a sine wave current and the synchronous motor thereby rotates. Since the stepping motor inputs a sine wave by dividing the wave into several steps, the magnetic field changes discontinuously and the motor repeats rotation, stop, rotation, stop . . . . As a result, large acceleration is generated every time the magnetic field changes discontinuously. And the above-stated tilt operation mechanism 204 operates, and a driving lever which is a cam piece which is not shown, provided on the pickup chassis 203 and abuts against a tilt cam cooperating with the tilt motor is repelled by the tilt cam. Due to this, when the pickup chassis 203 is rocked relative to the spindle chassis 202, the mechanical noise (which will be referred to as "mecha-noise" hereinafter) disadvantageously occurs. Also, because of the vibrated optical pickup, disturbance occurs to focus servo control and tracking servo control.

SUMMARY OF THE INVENTION

The present invention has been made in view of the above disadvantages. The object of the invention is to provide an optical disk drive apparatus, an optical disk driving method and an optical disk apparatus capable of reducing the occurrence of disturbance to focus servo control and tracking servo control.

To obtain the above object, an optical disk driving apparatus according to the present invention, having a tilt driving section on an optical disk for changing an incidence angle of a light spot applied from an optical pickup with respect to a rotating surface of an optical disk so as to record and reproduce information by applying the light spot by means of the optical pickup, is characterized in that the tilt driving section uses, as driving means, a stepping motor for changing an angle of the optical pickup with respect to the rotating surface of the optical disk and is provided with waveform shaping means for shaping a driving current waveform for driving the stepping motor.

Also, an optical disk driving method according to the present invention for changing an incidence angle of a light spot applied from an optical pickup with respect to a rotating surface of an optical disk so as to record and reproduce information in a tilt driving step by applying the light spot by means of the optical pickup, is characterized in that the tilt driving step comprises a waveform shaping step of shaping a driving current waveform driving a stepping motor, and a driving step of supplying the driving current waveform shaped in the waveform shaping step to the stepping motor serving as driving means and changing an angle of the optical pickup with respect to the rotating surface of the optical disk.

Further, an optical disk apparatus according to the present invention for changing an incidence angle of a light spot applied from an optical pickup with respect to a rotating surface of an optical disk by means of a tilt driving section, applying the light spot onto the optical disk by means of the optical pickup and thereby recording and reproducing information, is characterized in that the tilt driving section uses, as driving means, a stepping motor for changing an angle of the optical pickup with respect to the rotating surface of the optical disk and is provided with waveform shaping means for shaping a driving current waveform driving the stepping motor.

The optical disk driving apparatus, the optical disk driving method and the optical disk apparatus according to the present invention function as follows.

First, when a disk tray is moved forward, an optical disk is installed onto the disk tray. The disk tray is then moved backward while holding the optical disk. Thereafter, reproduction operation is designated by operating the operation section.

Since the tilt mechanism section employs a stepping motor serving as driving means for changing the angle of the optical pickup with respect to the rotating surface of the optical disk, the mechanism section can be moved to a tilt down maximum position and to a tilt up maximum position by driving the stepping motor by predetermined steps.

Here, since the initial position of the tilt operation is unknown, the tilt mechanism section is rotated by predetermined steps in the tilt up direction (or tilt down direction). At this moment, if the initial position is at the tilt minimum position, the tilt mechanism section reaches a tilt maximum position. Then, this tilt maximum position is set as a reference position and the mechanism section is rotated from this reference position in backward direction (tilt down direction) to a preset middle point by predetermined steps, whereby the optical pickup can be set at a tilt middle point.

Next, trial reproduction is performed. A jitter measurement circuit measures a jitter which is a fluctuation of a digital signal in time base direction during trial reproduction. The tilt motor driving circuit of the tilt mechanism section supplies a motor driving current to the tilt motor so that the jitter measured by the jitter measurement circuit becomes a minimum.

Here, for the purpose of smoothly rotating the tilt motor, in the tilt motor driving circuit, a rectangular driving current waveform is smoothly shaped by waveform shaping means. As a result, it is possible to ensure more accurate tilt control without mixing mechanical noise, the vibration of the optical pickup and the influence of disturbance to servo control into the jitter measurement result.

It is now assumed that the optical pickup is inclined in clockwise direction with respect to the rotating surface of the optical disk. In this state, if a jitter is detected from a reproduction signal of the optical disk, then the tilt motor is driven by the motor driving current corresponding to the rotation quantity at which the jitter becomes the minimum, the rotating force being transmitted to an optical pickup mounting surface and the optical pickup being inclined in counterclockwise direction. At this moment, the tilt motor smoothly rotates, so that the tilt of the optical pickup is smoothly adjusted. After performing tilt driving in this way, normal reproduction operation is started.

BRIEF DESCRIPTION OF THE DRAWINGS

FIG. 6 shows waveforms indicating the 1–2 phase excitation patterns of motor driving currents in this embodiment;

FIG. 10 is a perspective view of the appearance of a base unit in this embodiment;

DETAILED DESCRIPTION OF THE PREFERRED EMBODIMENT

Now, an optical disk apparatus in one embodiment according to the present invention will be described in detail with reference to the accompanying drawings.

Description of Disk Drive Mechanism

First, the outline of a disk drive mechanism as a premise of the optical disk apparatus will be described.

Figure 9:
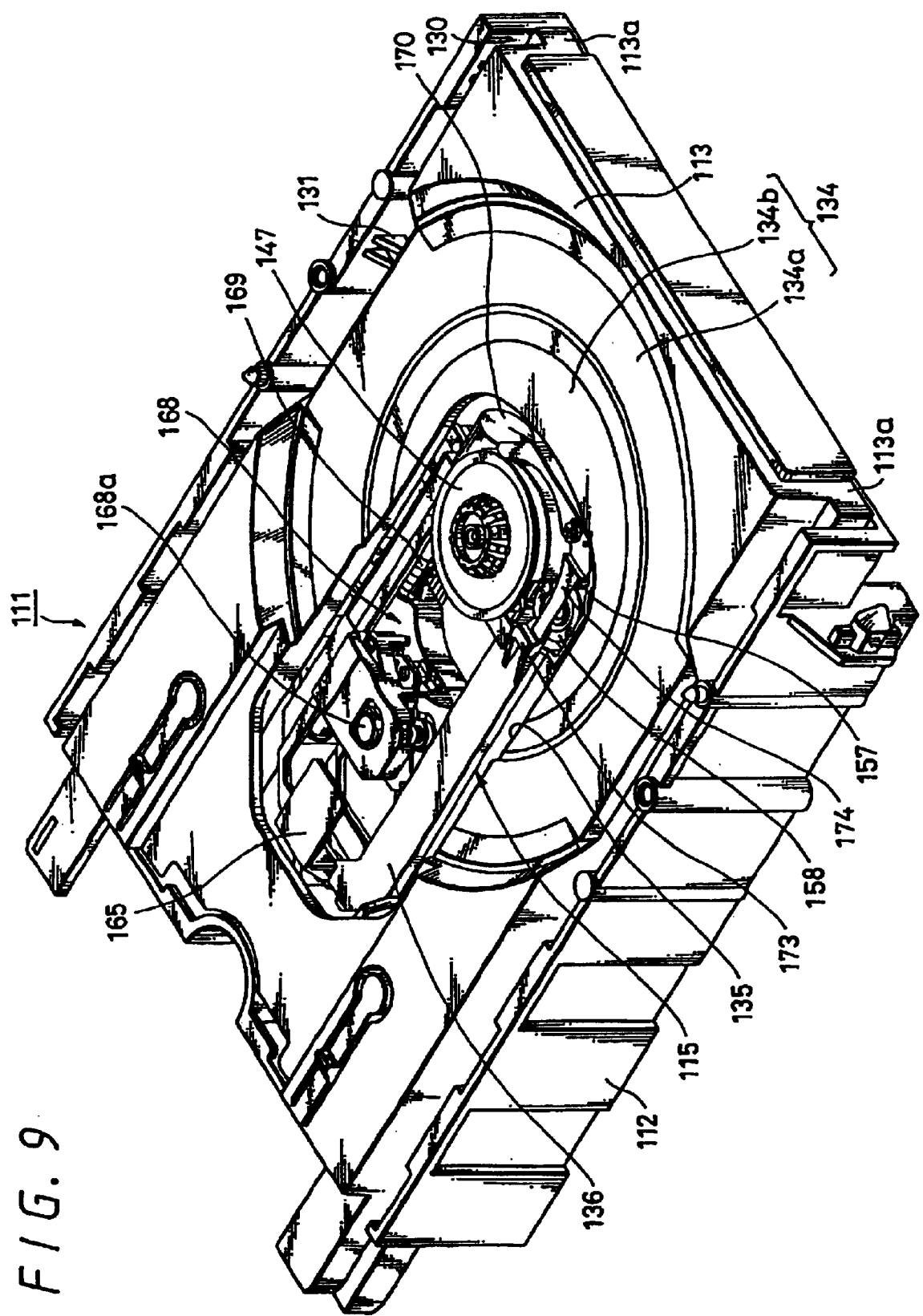
FIG. 9 is a perspective view of the appearance of a disk drive mechanism in this embodiment.
Figure 11:
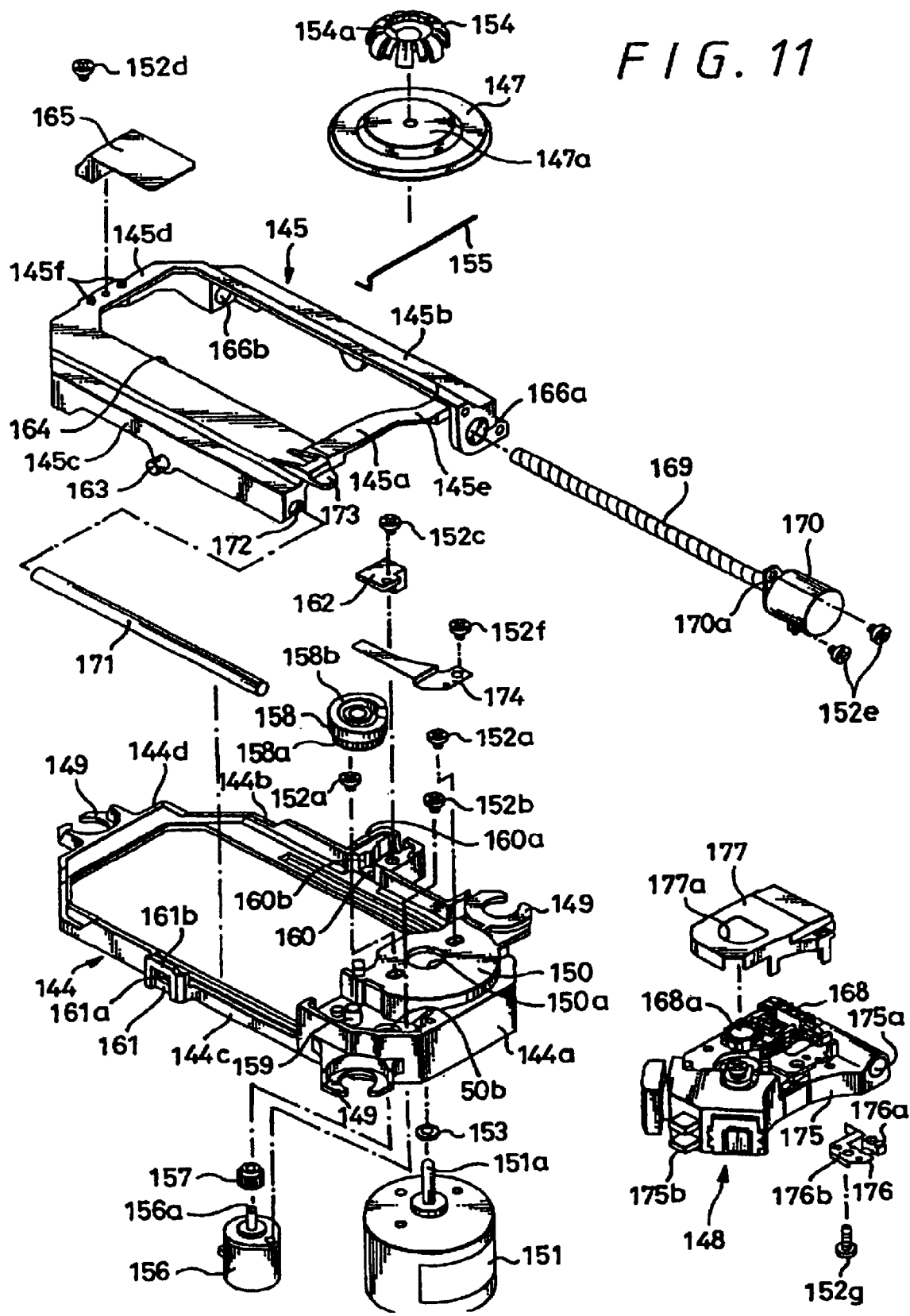
FIG. 11 is a perspective, exploded view of the base unit in this embodiment.
Figure 12:
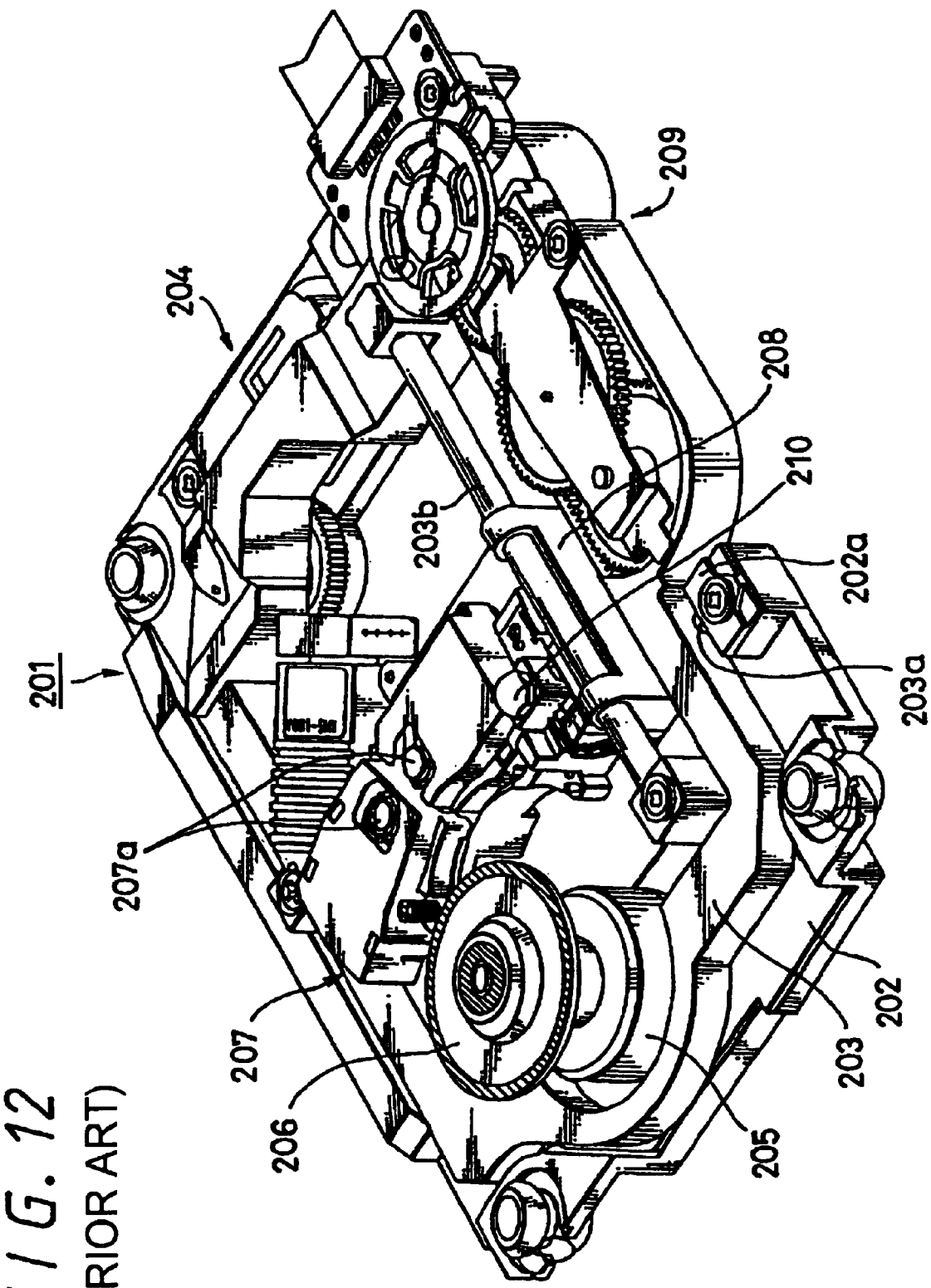
FIG. 12 is a perspective view showing a conventional disk drive mechanism.

FIGS. 9 to 11 show the configuration of a disk drive mechanism and that of a base unit included in the disk drive mechanism in this embodiment. It is noted that the base unit has a tilt mechanism for rocking a pickup chassis with respect to a spindle chassis by the rotation of a tilt motor.

As shown in FIG. 9, an optical disk drive mechanism 111 comprises a box-type main chassis 112 having opening portions on an upper surface and a front surface, a disk tray 113 taken in and out from the front surface opening portion of the main chassis 112, a base holder, which is not shown in FIG. 9, housed in a depressed portion of the main chassis 112 and rockably supported by the main chassis 112, a base unit 115 elastically supported by the base holder and the like.

The front surface opening portion of the main chassis 112 is a tray entrance 130. A plurality of tray guides 131 are provided in the respective inner surfaces of side pieces covering the both sides of the tray entrance 130. By regulating a pair of guide rails 113a, 113a and the like provided on laterally both sides of the disk tray 113, the disk tray 113 is movably held in longitudinal direction of the main chassis 112 and can be taken in and out from the tray entrance 130.

The disk tray 113 is provided with a disk container 134 which consists of a circular depressed portion and can contain an optical disk, such as a CD and CD-ROM, crosswise and with an long hole-like opening portion 135 opened to extend backward from the central portion of the disk container 134 along a tray center. The disk container 134 has a large diameter portion 134a on which an optical disk of a diameter of 12 centimeters is mounted and a small diameter portion 134b which consists of a depressed portion formed at the central portion of the large diameter portion 134a and on which an optical disk of a diameter of 8 centimeters is mounted.

The opening portion 135 of the disk tray 113 is formed forward with respect to the central portion of the small diameter portion 134b of the disk container 134 and extended to the outside of the disk container 134 by notching a part of the large diameter portion 134a. The size and shape of the opening portion 135 are designed to allow the upper portion of the base unit 115 to be described later in detail to enter the opening portion 135. A pair of right and left guide rails 113a and 113a extending parallel to the longitudinal direction of the disk tray 113 are provided on both lateral sides of the disk tray 113.

The base unit 115 is configured as shown in FIGS. 10 and 11. Specifically, the base unit 115 comprises a spindle chassis 144 rotatably supporting a turn table 147 onto which an optical disk used for the reproduction of information signals is installed, a pickup chassis 145 movably supporting an optical pickup unit 148 which reads information signals from the optical disk installed onto the turn table 147, and the like.

As shown in FIG. 11, the spindle chassis 144 of the base unit 115 consists of a frame member having a front surface piece 144a, right and left side surface pieces 144b, 144c and a rear surface piece 144d. Only the front surface piece 144a is set to have a height twice as large as those of the other pieces. Support portions 149 for supporting insulators, which are not shown, are provided in one of the corners of the front surface piece 144a, the front end portion of the side surface piece 144b opposite to the corner and the generally central portion of the rear surface piece 144d, respectively. The constricted part of the insulator is inserted into each of the support portions 149. The base unit 115 is elastically supported by the base holder through the insulators.

A motor mounting eye 150 is provided on the front surface piece 144a of the spindle chassis 144 by partly swelling the piece 144a upward. A spindle motor 151 is installed and fixedly fastened integrally into the motor mounting eye 150 by a plurality of fixing springs 152a. The rotary shaft 151a of the spindle motor 151 penetrates a through hole 150a of the motor mounting eye 150 and protrudes upward of the spindle chassis 144.

An offset washer 153 is fixedly fitted into the rotary shaft 151a of the spindle motor 151 and the turn table 147 is fixedly fitted thereinto upward of the offset washer 153. A ring fixing portion 147a is protruded at a central portion on the upper surface of the turn table 147 and a chucking ring 154 is fixedly fitted into the ring fixing portion 147a. A magnet 154a is embedded into the chucking ring 154 to be coaxial with a central hole. By fitting the central hole of an optical disk into the chucking ring 154, the optical disk is positioned on the turn table 147.

Reference number 155 shown in FIG. 11 denotes an offset spring for restricting the axial movement of the rotary shaft 151a. The offset spring 155 is mounted to cross the motor mounting eye 150, engaged with the offset washer 153 in the middle and engaged with the motor mounting eye 150 on both ends.

A tilt motor 156 is installed inside the motor mounting eye 150 to be aligned with the spindle motor 151. The tilt motor 156 serves as a driving source of the tilt operation mechanism and, for example, a double-pole, two-phase stepping motor is used as the tilt motor 156. The tilt motor 156 is fixedly fastened to the inside of the motor mounting eye 150 by a fixing spring 152b. The rotary shaft 156a of the tilt motor 156 penetrates the hole 150b of the motor mounting eye 150 and protrudes upward of the spindle chassis 144. A tilt gear 157 is fixedly fitted into the rotary shaft 156a of the tilt motor 156 and a gear portion 158a of a tilt cam 158 is engaged with the tilt gear 157.

The tilt cam 158 is an example of a member for rocking the pickup chassis 145 and has the gear portion 158a provided at the lower portion of the cam 158 and a cam face 158b provided on the upper end face thereof. The cam face 158b of the tilt cam 158 has an inclined portion spirally extended by 360 degrees. The pickup chassis 145 is vertically rocked, that is, tilted by strokes of the cam face 158b in height direction. The tilt cam 158 is rotatably supported by a support shaft 159 provided on the upper surface of the front surface piece 144a of the spindle chassis 144. A stopper boss 159a protruding toward the upper surface of the front surface piece 144a is provided in the vicinity of the support shaft 159.

A rib portion 158c provided on the lower surface of the tilt cam 158 is abutted against the stopper boss 159a. The positional relationship between the rib portion 158c of the tilt cam 158 and the stopper boss 159a is set such that when the rib portion 158c is rotated in one direction by the rotation of the tilt cam 158 and is abutted against one surface of the stopper boss 159a, a cam piece 173 which contacts with the cam face 158b is put at the highest position and when the rib portion 158c is rotated in opposite direction and abutted against the other surface of the stopper boss 159a, the cam piece 173 which contacts with the cam face 158b is put at the lowest position. The operation of the tilt motor 156 which controls the rotating operation of the tilt cam 158 will be described later in detail.

Further, each of the side surface pieces 144b, 144c and rear surface piece 144d of the spindle chassis 144 is formed to have a generally L-shaped cross section in the entire length in the longitudinal direction. These cross sections are aimed to intensify the overall rigidity of the spindle chassis 144. Besides, a pair of bearing portions 160 and 161 are provided at the generally central portions of the side surface pieces 144b and 144c in longitudinal direction to protrude in lateral direction, respectively. A pair of rotary shaft portions 163 provided at the pickup chassis 145 are rotatably held by the bearing portions 160 and 161, respectively.

One bearing portion 160 comprises a box-like frame 160a protruding greatly outside and having an opening portion on the upper surface thereof and a V-shaped reception surface 160b provided inside the box frame 160a. One rotary shaft 163 is mounted on the surface 160b and pressed from upward by a presser piece 162, thereby preventing the rotary shaft 163 from detaching from the surface 160b. The presser piece 162 is fixedly fastened to the box-shaped frame 160a by a fixing spring 152c. The other bearing portion 161 comprises a V-shaped reception surface 161a and a gate-like presser piece 161b covering the reception surface 161a. The presser piece 161b is formed integrally with the side surface piece 144c. By inserting the other rotary shaft 163 from inside, the rotary shaft 163 is rotatably held between the presser piece 161b and the reception piece 161a.

The pickup chassis 145 is formed to have a size which is generally the same as that of the spindle chassis 144 excluding the front surface piece 144a if viewed in plane. Specifically, the pickup chassis 145 is arranged in back of the front surface piece 144a of the spindle chassis 144 and consists of a frame-shaped member having the front surface piece 145a adjacent to the front surface piece 144a, a pair of right and left side surface pieces 145b and 145c opposite each other and a rear surface piece 145d provided backward and continuous to the side surface pieces. An opening portion 164 into which the optical head 168 of the optical pickup unit 148 is penetrated is provided inside of the frame-shaped member.

The side surface pieces 145b, 145c and the rear surface piece 145d of the pickup chassis 145 except for the front surface piece 145a are each formed to have an L-shaped cross section over the almost entire length in longitudinal direction. These cross sections allow intensifying the overall rigidity of the pickup chassis 145. A pair of rotary shafts 163 described above are protruded at almost the central portion of the both side surface pieces 145b and 145c in longitudinal direction, respectively. The heights of the side surface pieces 145b, 145c and of the rear surface piece 145d are set to almost the same as those of the side surface pieces 144b and the like of the spindle chassis 144. Therefore, by superimposing the pickup chassis 145 on the spindle chassis 144 at a predetermined position, the height of the superimposed portion is set almost the same as that of the front surface piece 144a of the spindle chassis 144.

Meanwhile, the front surface piece 145a of the pickup chassis 145 is formed to be plate-shaped so as to couple with the right and left side surface pieces 145b and 145c only on the upper surface. On the upper surface of the front surface piece 145a, an inclined portion 145e having the side surface piece 145b lowered so as to incline in horizontal direction which is the extending direction of the piece 145a. The front surface piece 145a constitutes the edge portion of the pickup chassis 145 which portion penetrates the lower side of the turn table 147. By providing the inclined portion 145e at the front surface piece 145a of the pickup chassis 145, it is possible to reduce the number of parts and to enhance assembly efficiency, thereby facilitating assembly operation compared with a conventional base chassis.

Furthermore, positioning protrusions 145f are provided on the upper surface of the rear surface piece 145d of the pickup chassis 145. Using this positioning protrusions 145f, a light shielding plate 165 is fixedly fastened onto the rear surface piece 145d by a fixing screw 152d. The light shielding plate 165 has a generally L-shaped cross section and covers the upper portion of the optical head 168 of the optical pickup unit 148 moved to the outermost side or, in particular, an objective lens 168a.

A insertion hole 166a is provided at the front edge of the side surface piece 145b of the pickup chassis 145 and a bearing portion 166b is provided at the rear end thereof. A bearing member provided at the feed motor 170 is fitted into the insertion hole 166a provided at the front portion and the tip end portion of a feed shaft 169 inserted into the insertion hole 166a is rotatably supported by the bearing portion 166b. The feed shaft 169 serves as the rotary shaft of the feed motor 170. Spiral grooves are formed on the outer periphery of the feed shaft 169 and the feed shaft 169 per se constitutes part of the rotor of the feed motor 170. The feed motor 170 is fixed to the front edge of the side surface piece 145b so as to protrude forward of the pickup chassis 145 by fastening a bracket 170a at the fixed side by two fixing screws 152e.

A guide shaft 171 is attached parallel to the feed shaft 169 and inside of the other side surface piece 145c of the pickup chassis 145 at the opposite side of the feed motor 169. Due to this, a pair of insertion holes 172 are provided at the front edge and rear edge of the side surface piece 145c, respectively and the guide shaft 171 is supported by the pickup chassis 145 on the both ends thereof by press-fitting the both ends of the shaft 171 into the insertion holes 172, respectively.

Moreover, a cam piece 173 protruding toward the tilt cam 158 side is provided on the upper front edge of the other side surface piece 145c of the pickup chassis 145. The free end of a plate spring 174 is press-contacted with the cam piece 173. The cam piece 173 is urged by the spring force of the plate spring 174 and press-contacted with the cam face 158b of the tilt cam 158 provided below the cam piece 173. The fixed end of the plate spring 174 is fixedly fastened to the upper surface of the front surface piece 144a of the spindle chassis 144 by a fixing screw 152f.

The optical pickup unit 148 movably supported by the feed shaft 169 and the guide shaft 171 is guided by both the shafts 169 and 171 and can approach and separate from the turn table 147. The optical pickup unit 148 has a slide member 175 on which the optical head 168 is mounted. A bearing hole 175a is provided at one side of the slide member 175 and the feed shaft 169 is slidably inserted into the bearing hole 175a.

A rack portion 176a of a slide rack 176 attached onto the lower surface of the slide member 175 is engaged with the grooves of the feed shaft 169. The rack portion 176a is formed integrally with a fixed piece 176b through an elastic piece. By fastening the fixed piece 176b with a fixing screw 152g, the slide rack 176 is fixed to the slide member 175. A bearing portion 175b is also provided at the other side of the slide member 175 and a guide shaft 171 is slidably nipped into the bearing portion 175b.

The feed shaft 169 and the feed motor 170 stated above constitute a head feed mechanism for moving the optical pickup unit 148. The feed shaft 169 and the slide rack 176 constitute a reduction mechanism. The tilt motor 156, the tilt gear 157, the tilt cam 158, the stopper boss 159a, the cam piece 173 and the plate spring 174 constitute a tilt operation mechanism for sliding the pickup chassis 145 relative to the spindle chassis 144 and making tilt adjustment.

The optical head 168 of the optical pickup unit 148 has a biaxial actuator capable of independently moving the objective lens 168a in focus direction (vertical direction) and tracking direction (axial direction). An electromagnetic force is mainly used as the driving force of the biaxial actuator. In this embodiment, for example, a biaxial actuator of plate spring type classified as a type having a different movable portion supporting system. Needless to say, it is also possible to appropriately use other types of biaxial actuators including those of a wire support type, a hinge type and shaft sliding type. It is noted that reference number 177 shown in FIG. 11 denotes a biaxial cover which covers the biaxial actuator. An opening window 177a for exposing the objective lens 168a is provided in the biaxial cover 177.

Description of Optical Disk Reproducing Apparatus Which Performs Focus Operation and Tracking Operation Now, description will be given to an optical disk reproducing apparatus which performs focus operation and tracking operation to the disk drive mechanism configured as stated above.

Figure 1:
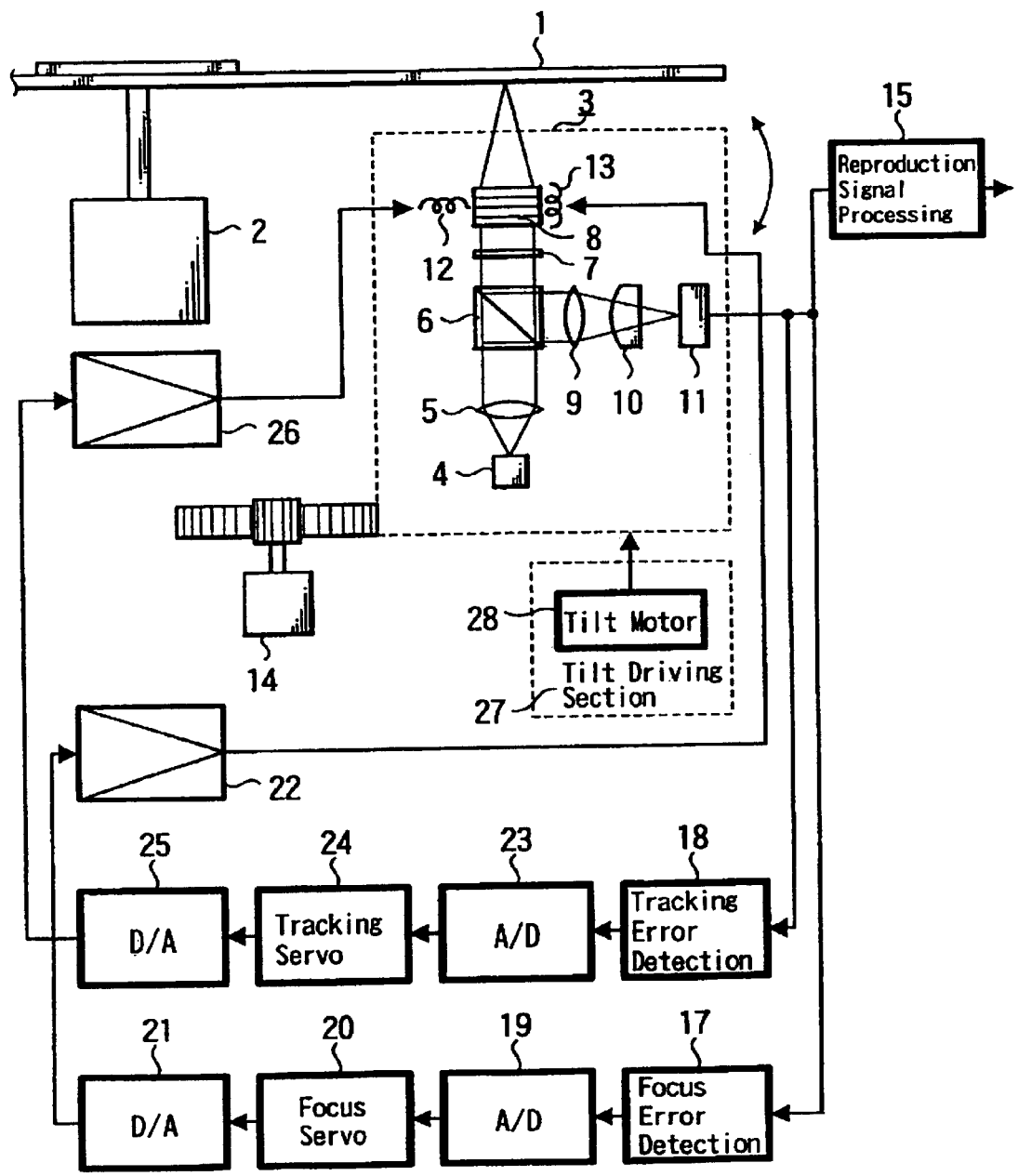
FIG. 1 is a block diagram showing the configuration of an optical disk reproducing apparatus in one embodiment according to the present invention.

FIG. 1 is a block diagram showing the configuration of an optical disk reproducing apparatus in one embodiment according to the present invention.

An optical pickup 3 is provided with optical devices for applying a laser beam onto an optical disk 1 and detecting a reflected light from the optical disk 1.

That is, a laser diode 4 is arranged at the optical pickup 3. The laser diode 4 emits a laser beam. The laser beam is formed into a parallel beam by a collimator lens 5, transmitted by a beam splitter 6 and applied onto the signal recording surface of the optical disk 1 through a half wave plate 7 and an objective lens 8.

The reflected light from the optical disk 1 is reflected by the beam splitter 6 through the objective lens 8 and the half wave plate 7 and received by a photo-detector 11 through a condensing lens 9 and a cylindrical lens 10.

Now, the objective lens 8 is supported by the biaxial actuator and movable in both the tracking direction and the focus direction. In other words, the objective lens 8 is driven in tracking direction in accordance with a current applied to a tracking coil 12 of the biaxial actuator. The objective lens 8 is driven in focus direction in accordance with a current applied to a focus coil 13 of the biaxial actuator.

Further, the entire optical pickup 3 is movable in tracking direction by a slide feed motor 14. The above-stated pickup chassis 145 including the optical pickup 3 and the slide feed motor 14 (which is not shown in FIG. 1) shown in FIGS. 10 and 11, is slidable so that the angle of the chassis 145 with respect to the rotating surface of the optical disk 1 can be changed by the tilt motor 28 driven by a driving current supplied from a tilt driving section 27. The configuration and operation of the tilt driving section 27 will be described later in detail.

Structure of Photo-Detector

Figure 2:
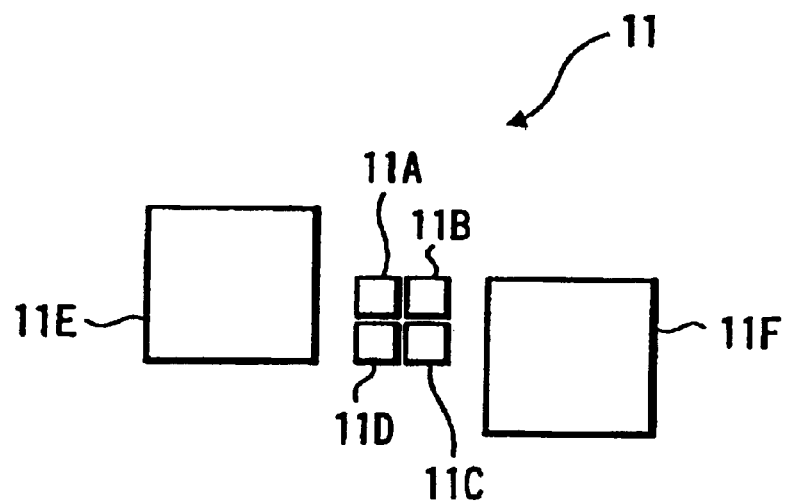
FIG. 2 shows the structure of a photo-detector in this embodiment.

FIG. 2 shows the structure of a photo-detector in one embodiment according to the present invention.

As shown in FIG. 2, a photo-detector 11 consists of a four-division photo-diodes 11A, 11B, 11C and 11D for detecting a focus error signal, and two-division photo-diodes 11E and 11F for detecting a tracking error signal. Among the four-division photo-diodes 11A, 11B, 11C and 11D, the photo-diodes 11A and 11D are arranged in the direction crossing the track of the optical disk and the photo-diodes 11B and 11C are arranged in the direction crossing the track of the optical disk. The photo-diodes 11E and 11F are arranged to be offset in the direction crossing the track of the optical disk.

A light spot received by the photo-detector by means of a diffraction grating, which is not shown, is turned into three light spots, i.e., a main beam of a 0 order light, a sub-beam of a +1 order diffracted light and a sub-beam of a −1 order diffracted light about the main beam in track crossing direction.

The main beam of the 0 order light is received by the four-division photo-diodes 11A, 11B, 11C and 11D, whereas the sub-beam of the +1 order diffracted light and that of the −1 diffracted light are received by the photo-diodes 11E and 11F.

An addition signal A+B+C+D of the outputs of the photo-diodes 11A to 11D of the photo-detector 11 is supplied to a reproduction signal processing circuit 15.

The outputs of the photo-diodes 11A to 11D of the photo-detector 11 are supplied to a focus error detection circuit 17. In the focus error detection circuit 17, the difference signal (A+C)−(B+D) between the addition signal A+C of the outputs of the photo-diodes 11A and 11C and the addition signal B+D of the outputs of the photo-diodes 11B and 11D is detected. The difference signal (A+C)−(B+D) between the added outputs of the photo-diodes 11A and 11C and those of the photo-diodes 11B and 11D is set as a focus error signal.

Figure 3:
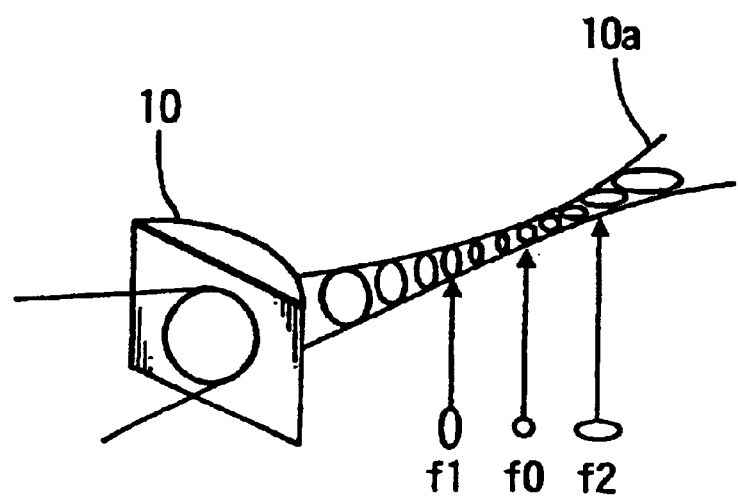
FIG. 3 shows how a light beam after passing through the cylindrical lens changes its shape in this embodiment.

FIG. 3 shows how the light beam after passing through the cylindrical lens changes its shape in this embodiment.

As shown in FIG. 3, a reflected beam 10a through the cylindrical lens 10 is turned into a circular beam at a focusing position f0 and into an ellipsoidal beam at positions f1 and f2 shifted from the focusing position f0. Therefore, using the difference signal between the added outputs of the photo-diodes 11A and 11C and those of the photo-diodes 11B and 11D for detecting the ellipsoidal beam, a focus error signal can be obtained.

Further, the outputs of the photo-diodes 11E and 11F of the photo-detector 11 are supplied to the tracking error detection circuit 18. In the tracking error detection circuit 18, the difference signal (E–F) between the output E of the photo-diode 11E and the output F of the photo-diode 11F is set as a tracking error signal.

A focus error signal outputted from the focus error detection circuit 17 is digitized by an A/D converter 19 and supplied to a focus servo circuit 20. The output of the focus servo circuit 20 is supplied, as a focus coil driving current, to a focus coil 13 through a D/A converter 21 and a driving amplifier 22. As a result, the objective lens 8 is moved in focus direction to reach a focusing position.

A tracking error signal outputted from the tracking error detection circuit 18 is digitized by an A/D converter 23 and supplied to a tracking servo circuit 24. The output of the tracking servo circuit 24 is supplied, as a tracking coil driving current, to a tracking coil 12 through a D/A converter 25 and a driving amplifier 26. As a result, the objective lens 8 is moved in tracking direction so that a beam spot traces a track center.

Description of Tilt Driving Section

Figure 4:
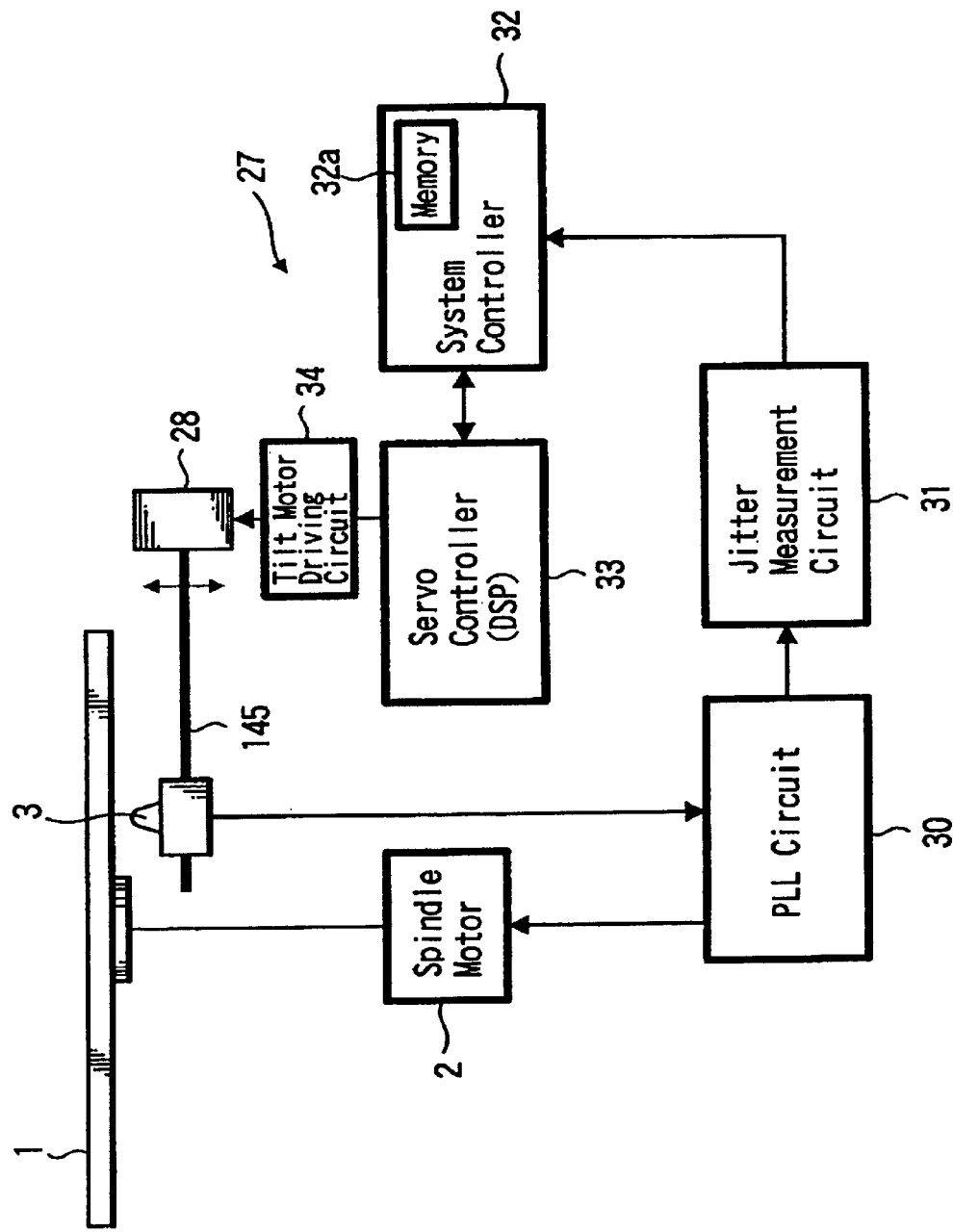
FIG. 4 is a block diagram showing the configuration of a tilt driving section in this embodiment.

FIG. 4 is a block diagram showing the configuration of the tilt driving section in this embodiment.

The schematic structure of the tilt driving control system of the optical disk reproducing apparatus stated above is shown in FIG. 4. In FIG. 4, the optical disk 1 installed on the turn-table is rotated integrally with the table by the rotating force of the spindle motor 2. The tilt of the optical head of the optical pickup 3 with the information recording surface of the optical disk 1 facing the objective lens is changed by driving the tilt motor 28 through the rocking operation of the pickup chassis 145 shown in FIGS. 10 and 11. An information signal read from the information recording surface by the optical pickup 3 is supplied to a PLL (phase locked loop) circuit 30. The PLL circuit 30 generates a synchronous signal in a fundamental period for discriminating whether the code of a pulse signal obtained by shaping the detected information signal is "1" or "0".

The signal outputted from the PLL circuit 30 is supplied to a jitter measurement circuit 31. The jitter measurement circuit 31 measures a jitter which is a fluctuation of a digital signal in time base direction, converts the magnitude of the fluctuation into a numeric value and outputs the resultant numeric value. If the jitter increases, a code error occurs and an information signal cannot be read. To prevent this, the jitter measurement circuit 31 is provided. The signal outputted from the jitter measurement circuit 31 is supplied to a system controller 32. The system controller 32 includes a memory 32a into which predetermined information is recorded in advance and new information is written if necessary. The controller 32 is used to control the optical disk reproducing apparatus and the tilt driving section 27.

The system controller 32 is connected to the servo controller 33 so that a signal can be transmitted and received between the controllers 32 and 33. Based on the signal supplied from the system controller 32, a signal is supplied to the tilt motor driving circuit 34 through the servo controller 33. The tilt motor driving circuit 34 drives the tilt motor 28. If required, the circuit 34 outputs a control signal to rotate the tilt motor 28 in forward or backward direction. As the tilt motor 28 is rotated, the position of the pickup chassis 145 on which the optical pickup 3 is mounted is changed between a position in a down state (a tilt down stopper position) and that in an up state (a tilt up stopper position) as the largest tilt quantity according to the direction in which the tilt motor 28 is rotated. The tilt operation mechanism executes tilt control within the rocking range of the pickup chassis 145.

The tilt motor 28 stated above is comprised of a stepping motor in this embodiment. In case of 1–2 phase excitation system, if 40 steps are fed, the motor rotates once. Thus, if the motor rotates twice by feeding 80 steps in the 1–2 phase excitation system (i.e., if the motor rotates twice by feeding 40 steps in a 2-phase excitation system because the motor rotates once if feeding 20 steps in the 2-phase excitation system), then the tilt cam 158 is rotated once. Accordingly, if the tilt motor 28 rotates twice, the tilt cam 158 rotates once and the cam piece 173 contacting with the cam face 158b of the tilt cam 158 can be moved to the tilt down stopper position and to the tilt up stopper position.

In this embodiment, in particular, a rectangular driving current waveform is shaped into a smooth waveform by a tilt motor driving circuit to be described later, thereby allowing the tilt motor 28 to rotate smoothly.

Description of Tilt Motor Driving Circuit

Figure 5:
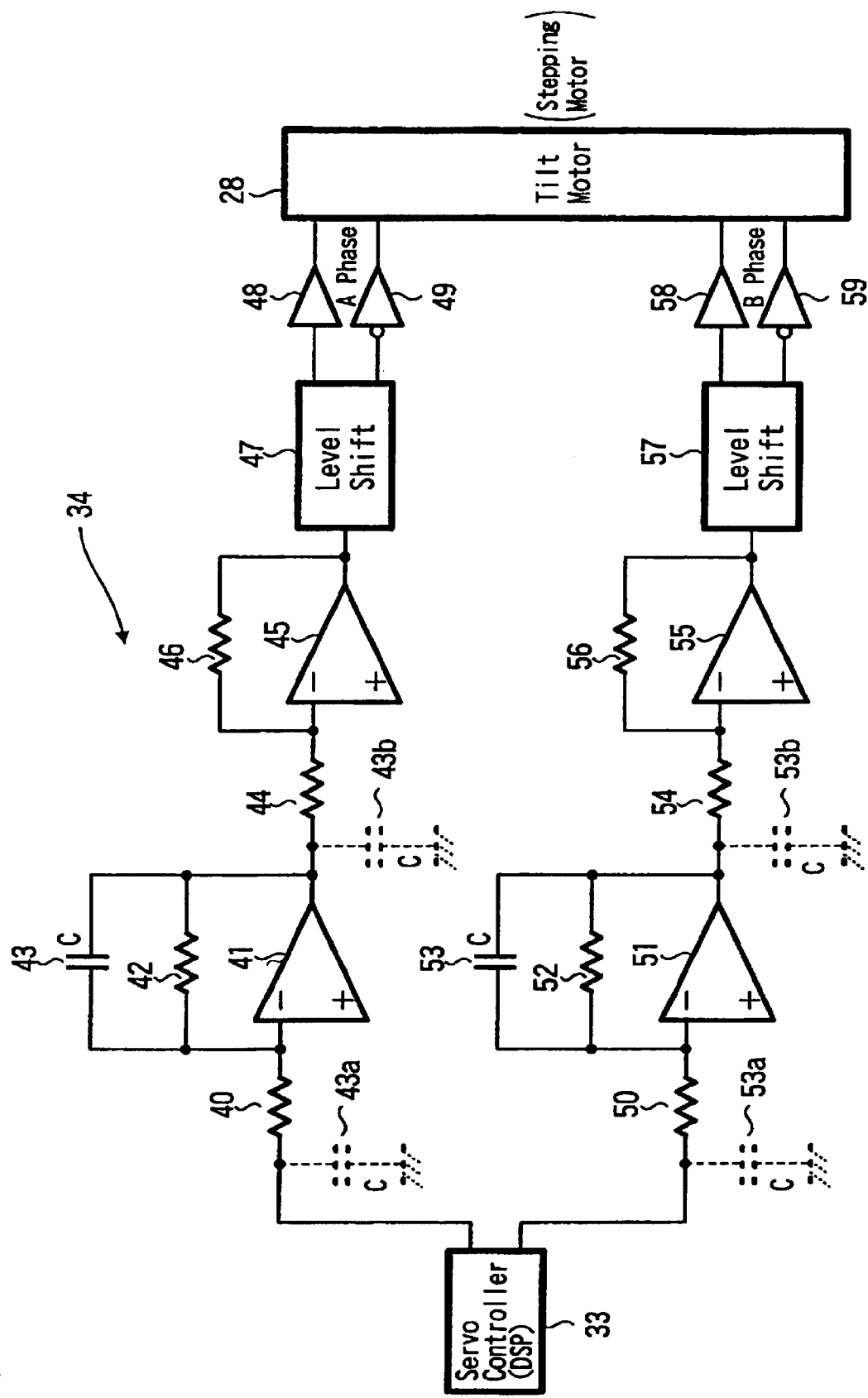
FIG. 5 is a circuit diagram showing the configuration of a tilt motor driving circuit in this embodiment.

FIG. 5 is a circuit diagram showing the configuration of the tilt motor driving circuit in this embodiment.

First, description will be given to the connections of the tilt motor driving circuit.

In FIG. 5, one of the output terminals of the servo controller 33 is connected to one end of a resistor 40 and the other end of the resistor 40 is connected to an inverted input terminal of an operational amplifier 41. The inverted input terminal of the operational amplifier 41 is connected to one end of a resistor 42 and the output terminal of the operational amplifier 41 is connected to the other end of the resistor 42. Here, the operational amplifier 41 and the resistors 40, 42 constitute a inverting amplifier circuit. The amplification factor of the operational amplifier 41 is set based on the resistance values of the resistors 40 and 42.

The output terminal of the operational amplifier 41 is connected to one end of a resistor 44 and the other end of the resistor 44 is connected to the inverted input terminal of an operational amplifier 45. The inverted input terminal of the operational amplifier 45 is connected to one end of a resistor 46 and the output terminal of the operational amplifier 45 is connected to the other end of the resistor 46. Here, the operational amplifier 45 and the resistors 44, 46 constitute an inverting amplifier circuit. The amplification factor of the operational amplifier 45 is set based on the resistance values of the resistors 44 and 46.

The output terminal of the operational amplifier 45 is connected to the input terminal of a level shift circuit 47. One of the output terminals of the level shift circuit 47 is connected to the input terminal of an amplifier 48. The other output terminal of the level shift circuit 47 is connected to the input terminal of an inverter 49. The output terminal of the amplifier 48 is connected to one end of an A-phase coil of the tilt motor 28 and the output terminal of the inverter 49 is connected to the other end of the A-phase coil of the tilt motor 28.

Likewise, the other output terminal of the servo controller 33 is connected to one end of a resistor 50 and the other end of the resistor 50 is connected to the inverted input terminal of an operational amplifier 51. The inverted input terminal of the operational amplifier 51 is connected to one end of a resistor 52 and the output terminal of the operational amplifier 51 is connected to the other end of a resistor 52. Here, the operational amplifier 51 and the resistors 50, 52 constitute an inverting amplifier circuit. The amplification factor of the operational amplifier 51 is set based on the resistance values of the resistors 50 and 52.

Further, the output terminal of the operational amplifier 51 is connected to one end of a resistor 54 and the other end of the resistor 54 is connected to the inverted input terminal of an operational amplifier 55. The inverted input terminal of the operational amplifier 55 is connected to one end of a resistor 56 and the output terminal of the operation amplifieral 55 is connected to the other end of a resistor 56. Here, the operational amplifier 55 and the resistors 54, 56 constitute an inverting amplifier circuit. The amplification factor of the operational amplifier 55 is set based on the resistance values of the resistors 54 and 56.

The output terminal of the operational amplifier 55 is connected to the input terminal of a level shift circuit 57. One of the output terminals of the level shift circuit 57 is connected to the input terminal of an amplifier 58. The other output terminal of the level shift circuit 57 is connected to the input terminal of an inverter 59. The output terminal of the amplifier 58 is connected to one end of a B-phase coil of the tilt motor 28 and the output terminal of the inverter 59 is connected to the other end of the B-phase coil of the tilt motor 28.

Here, a capacitor 43 is specially connected to the both ends of the resistor 42 and a capacitor 53 is specially connected to the both ends of the resistor 52. The capacitor 43 together with the resistor 42 constitutes a low pass filter. The capacitor 53 together with the resistor 52 constitutes a low pass filter.

Also, a capacitor which is not shown in FIG. 5 is connected to the both ends of the resistor 46 and a capacitor which is not shown therein is connected to the both ends of the resistor 56. The former capacitor together with the resistor 46 constitutes a low pass filter and the latter capacitor together with the resistor 56 constitutes a low pass filter.

Alternatively, as indicated by dotted lines, a capacitor 43a may be connected between one end of the resistor 40 and a ground and a capacitor 53a may be connected between one end of the resistor 50 and the ground. The capacitor 43a and the resistor 40 constitute a low pass filter and the capacitor 53a and the resistor 50 constitute a low pass filter.

Alternatively, as indicated by dotted lines, a capacitor 43b may be connected between one end of the resistor 44 and the ground and a capacitor 53b may be connected between one end of the resistor 54 and the ground. The capacitor 43b and the resistor 44 constitute a low pass filter, and the capacitor 53b and the resistor 54 constitute a low pass filter.

The operation of the tilt motor driving circuit configured as stated above will be described hereinafter.

In FIG. 5, the servo controller 33 outputs a control signal for the tilt motor 28 based on the tilt motor control data recorded in a table manner in the memory 32a of the system controller 32 shown in FIG. 4. A control signal for the A-phase coil of the tilt motor 28 is supplied to the inverted input terminal of the operational amplifier 41 through the resistor 40.

The operational amplifier 41 and the resistors 40, 42 invert and amplify the control signal supplied from the servo controller 33 with a predetermined amplification factor and the amplified control signal is outputted from the output terminal. The control signal amplified by the operational amplifier 41 and the resistors 40 and 42 is supplied to the inverted input terminal of the operational amplifier 45 through the resistor 44.

The operational amplifier 45 and the resistors 44, 46 further invert and amplify the inverted, amplified control signal supplied from the operational amplifier 41 with a predetermined amplification factor and the resultant signal is outputted from the output terminal. The control signal further inverted and amplified by the operational amplifier 45 and the resistors 44 and 46 is supplied to the level shift circuit 47.

The level shift circuit 47 shifts the center of the amplitude of the control signal outputted from the output terminal of the operational amplifier 45 to have a middle point potential. The control signal outputted from one of the output terminals of the level shift circuit 47 is amplified, as a tilt motor driving current, by the amplifier 48 and supplied to one end of the A-phase coil of the tilt motor 28. The control signal outputted from the other output terminal of the level shift circuit 47 is inverted and amplified, as a tilt motor driving current, by the inverter 49 and supplied to the other end of the A-phase coil of the tilt motor 28.

Likewise, a control signal for the B-phase of the tilt motor 28 is supplied to the inverted input terminal of the operational amplifier 51 through the resistor 50.

The operational amplifier 51 and the resistors 50, 52 invert and amplify the control signal supplied from the servo controller 33 with a predetermined amplification factor and the resultant signal is outputted from the output terminal. The control signal inverted and amplified by the operational amplifier 51 and the resistors 50, 52 is supplied to the inverted input terminal of the operational amplifier 55 through the resistor 54.

The operational amplifier 55 and the resistors 54, 56 further invert and amplify the inverted, amplified control signal supplied from the operational amplifier 51 with a predetermined amplification factor and the resultant control signal is outputted from the output terminal. The control signal further inverted and amplified by the operational amplifier 55 and the resistors 54, 56 is supplied to the level shift circuit 57.

The level shift circuit 57 shifts the center of the amplitude of the control signal outputted from the output terminal of the operational amplifier 55 to have a middle point potential. The control signal outputted from one of the output terminals of the level shift circuit 57 is amplified, as a tilt motor driving current, by the amplifier 58 and supplied to one end of the B-phase coil of the tilt motor 28. Also, the control signal outputted from the other output terminal of the level shift circuit 57 is inverted and amplified, as a tilt motor driving current, by the inverter 59 and supplied to the other end of the B-phase coil of the tilt motor 28.

FIG. 6 shows the 1–2 phase excitation pattern of a motor driving current in this embodiment. In FIG. 6A, a driving current supplied to the A-phase coil of the tilt motor 28 rises from 0 to a maximum value MAX at a phase t0, maintains the maximum MAX from phases t0 to t3, falls from the maximum value MAX to 0 at a phase t3 and maintains 0 from phases t3 to t4. Conversely, the driving current falls from 0 to a minimum value MIN at a phase t4, maintains the minimum value MIN from phases t4 to t7, falls from the minimum value MIN to 0 at a phase t7 and maintains 0 from phases t7 to t8. The driving current repeats the same waveform variation from phases t8 to t16, t16 to t24 and t24 to t32.

Also, in FIG. 6B, a driving current supplied to the B-phase coil of the tilt motor has a waveform delayed by a phase t6 with respect to the A-phase driving current.

Now, the tilt motor 28 is a stepping motor which is a kind of a synchronous motor. Since the synchronous motor inputs a sine wave current, the magnetic field continuously rotates and the motor, therefore, rotates smoothly. However, as shown in FIG. 6, since the stepping motor divides and inputs the sine wave into several steps, the magnetic field changes discontinuously. As a result, the motor rotates while repeating rotation, stop, rotation, stop, . . . Then, large acceleration is generated every time the magnetic field changes discontinuously and the cam piece 173 of the pickup chassis 145 is repelled by the tilt cam 158. Due to this, mecha-noise occurs, the optical pickup 3 is vibrated, and disturbance occurs to focus control and tracking control.

To avoid this, by providing the capacitors 43 and 53 as shown in FIG. 5, the capacitor 43 together with the resistor 42 constitutes a low pass filter and the capacitor 53 together with the resistor 52 constitutes a low pass filter. These low pass filters shut off high frequency components of the control signal supplied from the servo controller 33. Thus, the rise and fall parts of the motor driving currents shown in FIG. 6 are transiently delayed and turned into smooth waveforms as shown in FIG. 7, respectively.

Figures 7A, 7B:
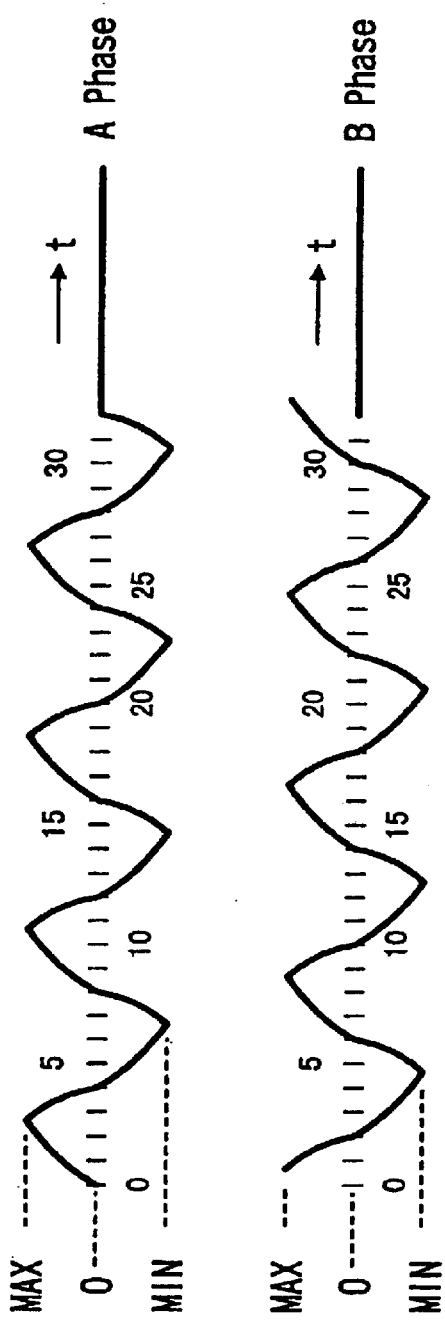
FIG. 7 shows continuous waveforms of the motor driving currents by capacitors in this embodiment.

FIG. 7 shows the continuous waveforms of the motor driving currents obtained by the capacitors. In FIG. 7A, the driving current supplied to the A-phase coil of the tilt motor smoothly rises from 0 to a maximum value MAX from phases t0 to t2, and smoothly falls from the maximum value MAX to 0 from phases t2 to t4. Conversely, the driving current smoothly falls from 0 to a minimum value MIN from phases t4 to t6 and smoothly rises from the minimum value MIN to 0 from phases t6 to t8. The driving current repeats the same waveform variation from phases t8 to t16, t16 to t24 and t24 to t32.

Also, in FIG. 7B, the driving current supplied to the B-phase coil of the tilt motor has a waveform delayed by a phase t6 with respect to that of the A-phase driving current.

As can be seen from the above, by providing capacitors 43 and 53 at the tilt motor driving circuit shown in FIG. 5, the discontinuous motor driving current shown in FIG. 6 is changed to a continuous motor driving current which rises with a delay shown in FIG. 7. This makes it possible to smoothly rotate the stepping motor serving as the tilt motor at every step of a phase. As a result, the tilt cam 158 is rotated while keeping in contact with the cam piece 173 of the pickup chassis 145. Thus, mecha-noise can be reduced and disturbance to the objective lens of the optical pickup 3 in focus and tracking directions can be reduced.

Alternatively, a capacitor may be connected to the both ends of the resistor 46 and a capacitor to the both ends of the resistors 56. The former capacitor together with the resistor 46 constitutes a low pass filter, whereas the latter capacitor together with the resistor 56 constitutes a low pass filter. As in the case of the above, with these low pass filters, it is possible to change the discontinuous motor driving current waveforms shown in FIG. 6 to the continuous motor driving current waveforms which rise with a delay as shown in FIG. 7, respectively.

Alternatively, as indicated by dotted lines in FIG. 5, a capacitor 43a may be connected between one end of the resistor 40 and the ground and a capacitor 53a between one end of the resistor 50 and the ground. The capacitor 43a and the resistor 40 constitute a low pass filter, whereas the capacitor 53a and the resistor 50 constitute a low pass filter. As in the case of the above, therefore, with these low pass filters, it is possible to change the discontinuous motor driving current waveforms shown in FIG. 6 to the continuous driving current waveforms which rise with a delay shown in FIG. 7, respectively.

Alternatively, as indicated by dotted line in FIG. 5, the capacitor 43b may be connected between one end of the resistor 44 and the ground and the capacitor 53b between one end of the resistor 54 and the ground. The capacitor 43b and the resistor 44 constitute a low pass filter, whereas the capacitor 53b and the resistor 54 constitute a low pass filter. As in the case of the above, therefore, with these low pass filters, it is possible to change the discontinuous motor driving current waveforms shown in FIG. 6 to the continuous motor driving current waveforms which rise with a delay shown in FIG. 7, respectively.

Alternatively, inverter circuits may be provided in front of the operational amplifiers 41 and 51, respectively, to delay rising waveforms and falling waveforms of the step-like motor driving currents and to shape the waveforms into smooth waveforms.

Although the capacitors, inverter circuits or the like constitute waveform shaping means, the waveform shaping means should not be limited thereto and may be selected from arbitrary means which can smoothly shape the rising waveforms and the falling waveforms of the motor driving currents.

Description of Tilt Operation

Figure 8:
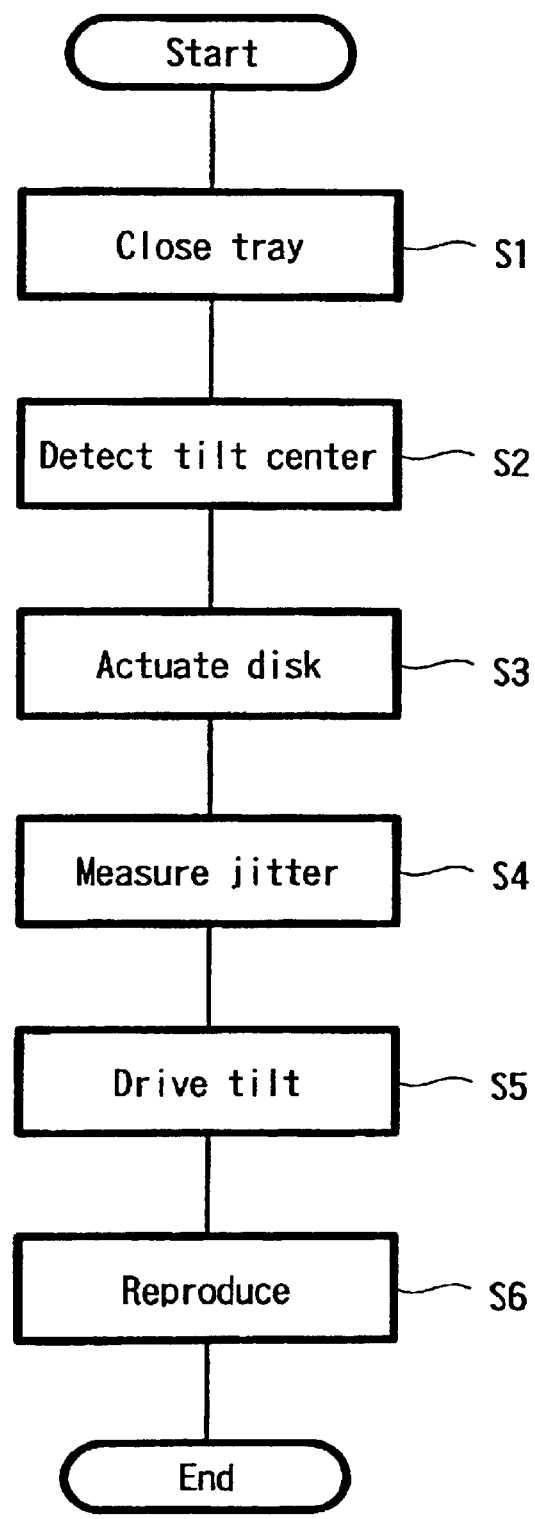
FIG. 8 is a flow chart showing tilt driving operation in this embodiment.

FIG. 8 is a flow chart showing the tilt operation in this embodiment.

In FIG. 8, the tray is closed in a step S1. To be specific, when the disk tray 113 shown in FIG. 9 is moved forward with respect to the main chassis 112, the optical disk is installed onto the tray and the disk tray 113 is moved backward with respect to the main chassis 112 while holding the optical disk. Thereafter, reproduction operation is designated by operating an operation section which is not shown in the drawings.

In a step S2, a tilt center is detected. To be specific, if the motor rotates twice by feeding 80 steps in the 1–2 phase excitation system (i.e., if the motor rotates twice by feeding 40 steps in the 2 phase excitation system because the motor rotates once by feeding 20 steps in the 2 phase excitation system), then the tilt cam 158 is set to rotate once in FIG. 11. Therefore, as the tilt motor 156 rotates twice, the tilt cam 158 rotates once and the cam piece 173 contacted with the cam face 158b of the tilt cam 158 is set to be moved to the tilt down stopper position and to the tilt up stopper position.

Here, since the initial position of the tilt operation is unknown, the tilt motor 156 is rotated by predetermined steps (e.g., 80 steps) in the tilt up direction (or tilt down direction). At this moment, if the initial position is at the tilt minimum position, the tilt motor 156 abuts against the stopper after being rotated by 80 pulses and reaches a tilt maximum position. Then, this tilt maximum position is set as a reference position and the rotary shaft 156a is rotated in the backward direction (tilt down direction) of the reference position to a preset middle point by predetermined steps (e.g., 40 steps), whereby the pickup chassis 145 can be set at a tilt middle point.

Next, in a step S3, the disk is actuated. Specifically, to perform trial reproduction in the jitter measurement in a step S4 to be described later, a spindle servo toward the spindle motor 2 shown in FIG. 1, a tracking servo toward the tracking coil 12 of the optical pickup 3 and a focus servo toward the focus coil 13 are controlled.

In the step S4, jitter measurement is made. To be specific, the jitter measurement circuit 31 shown in FIG. 4 measures a jitter which is a fluctuation of a digital signal in time base direction during trial reproduction, converts the magnitude of the fluctuation into a numeric value and outputs the numeric value. If the jitter increases, a code error may occur and an information signal cannot be read. To avoid this, the system controller 32 supplies a control signal to the servo controller 33 so that the jitter measured by the jitter measurement circuit 31 becomes a minimum. The servo controller 33 supplies a corresponding subordinate control signal to the tilt motor driving circuit 34. The tilt motor driving circuit 34 supplies a motor driving current to the tilt motor 28.

In this embodiment, particularly, the tilt motor 28 is rotated smoothly by smoothly shaping the rectangular driving current waveform using the tilt motor driving circuit 34.

In a step S5, tilt driving is carried out. To be specific, it is assumed that the pickup chassis 145 is inclined in clockwise direction about the rotary shaft portion 163 with respect to the spindle chassis 144. In this state, if the jitter of the optical disk is detected, the tilt motor 156 is driven by the motor driving current corresponding to the rotation quantity at which the jitter becomes the minimum and the rotating force is transmitted from the rotary shaft 156a to the tilt gear 157. If the tilt gear 157 rotates, the rotating force of the gear 157 is transmitted from the gear portion 58a engaged with the tilt gear 157 to the tilt cam 158. The tilt cam 158 is then rotated according to the rotation quantity of the tilt motor 156. If the highest position of the cam face 158b contacts with the cam piece 173 by the rotation of the tilt cam 158, the pickup chassis 145 is inclined in counterclockwise direction about the rotary shaft portion 163. At this moment, the tilt motor 156 smoothly rotates, so that the tilt of the optical pickup 3 is smoothly adjusted. After performing tilt driving in this way, normal reproduction operation is started.

The normal reproduction operation of the optical disk apparatus is as follows.

A laser beam is applied from the optical pickup 3 serving as an optical system onto the optical disk rotated by the spindle motor 2 servo-controlled by the spindle servo system of the servo circuit. After turning on the focus servo controlled by the focus servo system, a driving signal from the tracking servo system of the servo circuit is amplified by the driving amplifier 26 and applied to the tracking coil 12 of the biaxial actuator of the optical pickup 3 serving as the optical system. While the actuator is moving in tracking direction, a detection signal is detected from the photo-detector 11 in the optical system by the reflected light from the optical disk. Additionally, a driving signal from the focus servo system of the servo circuit is amplified by the driving actuator 22 and applied to the focus coil 13 of the biaxial actuator of the optical pickup 3 in the optical system. While the actuator is moving in focus direction, a detection signal is detected from the photo-detector 11 in the optical system by the reflected light from the optical disk.

A tracking error signal generated by the servo circuit is amplified and turned into a tracking actuator drive signal by the driving amplifier 26 and applied to the tracking coil 12 of the biaxial actuator of the optical pickup 3 serving as the optical system. Also, a focus error signal generated by the servo circuit is amplified and turned into a focus actuator drive signal by the driving amplifier 22 and applied to the focus coil 13 of the biaxial actuator of the optical pickup 3 serving as the optical system.

In the optical pickup serving as the optical system, the objective lens 8 is moved in focus direction (direction proximate to or distant from the optical disk 1) and in tracking direction (direction crossing the track of the optical disk) independently by the biaxial actuator utilizing an electromagnetic force.

Further, the optical pickup serving as the optical system sequentially moves in the outer peripheral direction of the optical disk synchronously with the rotation of the optical disk by a slide (thread) motor which is not shown in the drawings, whereby the laser beam application position is sequentially displaced toward the outer peripheral direction of the optical disk.

An RF amplifier in the reproduction signal processing circuit 15 generates an reproduction RF signal from the reflected light from the optical disk. The reproduction RF signal is subjected to demodulation processing in the reproduction signal processing circuit. An error correction code is detected and error correction processing is conducted to the reproduction RF signal. Thereafter, the resultant signal is subjected to de-interleave processing and EFM-PLUS demodulation processing. The resultant demodulated signal is amplified up to the level at which the signal can be outputted, and then outputted.

The system controller 32 generates a control signal to be fed to the servo circuit based on the RF signal from the RF amplifier, a control signal for use in gain setting to be fed to the gain setting section of the servo circuit, and the like. In addition thereto, the system controller 32 controls the signal processing of the data signal processing section and operations of various sections.

In an optical disk driving apparatus in this embodiment having a tilt driving section 27 on an optical disk for changing the incidence angle of a light spot applied from an optical pickup 3 with respect to the rotating surface of an optical disk so as to record and reproduce information by applying the light spot by means of the optical pickup 3, the tilt driving section 26 uses, as driving means, a stepping motor 28 for changing the angle of the optical pickup 3 with respect to the rotating surface of the optical disk and is provided with capacitors 43 and 53 serving as waveform shaping means for shaping a driving current waveform for driving the stepping motor. Due to this, it is possible to prevent the vibration of the optical pickup 3, to reduce disturbance derived from the vibration of the objective lens 8 to focus control and tracking control and to suppress mechanical noise while tilt driving is being performed. Besides, since there is no need to provide a tilt sensor, the optical pickup 3 can be made small in size and the smaller-sized optical disk driving apparatus can be, therefore, provided.

Furthermore, in the optical disk driving apparatus in this embodiment as stated above, the capacitors 43 and 53 serving as waveform shaping means smoothly shape the driving current waveform rising from a central value to a maximum amplitude value and falling from the maximum value to the central value. This makes it possible to smoothly rotate the stepping motor serving as the tilt motor 28 and to thereby transmit the rotating force while the transmission means of the tilt driving section for transmitting the rotation of the stepping motor are not repelled against each other but kept in contact with each other.

Moreover, in the optical disk driving apparatus in this embodiment as stated above, the capacitors 43 and 53 serving as waveform shaping means together with the resistors 42 and 52 constitute low pass filters, respectively. This makes it possible to shut off the high frequency components of the step-like motor driving current waveform and to delay the rising and falling of the motor driving current waveform to thereby provide a smooth waveform with the simple configuration.

In an optical disk driving method in this embodiment for changing the incidence angle of a light spot applied from an optical pickup 3 with respect to the rotating surface of an optical disk so as to record and reproduce information in a tilt driving step by applying the light spot on the optical disk by means of the optical pickup, the tilt driving step comprises a waveform shaping step of shaping a driving current waveform driving a stepping motor; and a driving step of supplying the driving current waveform shaped in the waveform shaping step to the stepping motor 28 serving as driving means and changing the angle of the optical pickup 3 with respect to the rotating surface of the optical disk. Due to this, it is possible to prevent the-vibration of the optical pickup 3, to reduce disturbance derived from the vibration of the objective lens 8 to focus control and tracking control and to suppress mechanical noise while tilt driving is being performed.

Further, in the optical disk driving method in this embodiment as stated above, the waveform shaping step is to smoothly shape the driving current waveform rising from a central value to a maximum amplitude value and falling from the maximum value to the central value. This makes it possible to smoothly rotate the stepping motor serving as the tilt motor 28 and to thereby transmit the rotating force while the tilt cam 158 and the cam piece 173 as the transmission means of the tilt mechanism step for transmitting the rotation of the stepping motor are not repelled against each other but kept in contact with each other.

Moreover, in the optical disk driving method in this embodiment as stated above, the waveform shaping step employs a low pass filter. This makes it possible to shut off the high frequency components of the step-like motor driving current waveform and to delay the rising and falling of the motor driving current waveform to thereby provide a smooth waveform with the simple configuration.

In an optical disk apparatus in this embodiment for changing the incidence angle of a light spot applied from an optical pickup 3 with respect to the rotating surface of an optical disk by means of a tilt driving section 27, applying the light spot onto the optical disk by means of the optical pickup 3 and thereby recording and reproducing information, the tilt driving section 27 uses, as driving means, a stepping motor 28 for changing the angle of the optical pickup 3 with respect to the rotating surface of the optical disk and is provided with capacitors 43 and 53 serving as waveform shaping means for shaping a driving current waveform driving the stepping motor. Due to this, it is possible to prevent the vibration of the optical pickup 3, to reduce disturbance derived from the vibration of the objective lens 8 to focus control and tracking control and to suppress mechanical noise while tilt driving is being performed. Besides, since there is no need to provide a tilt sensor, the optical pickup 3 can be made small in size and the smaller-sized optical disk driving apparatus can be, therefore, provided.

In the above-stated embodiment, description has been given to a case of applying the present invention to the detection of the radial tilt of the optical disk apparatus. Needless to say, it is also possible to apply the present invention to a card reader apparatus utilizing a stepping motor as a tilt motor and the radial tilt driving apparatus for other electronic equipment including a plate-like recording medium such as a hard disk.

In an optical disk driving apparatus according to the present invention, having a tilt driving section on an optical disk for changing the incidence angle of a light spot applied from an optical pickup with respect to the rotating surface of an optical disk so as to record and reproduce information by applying the light spot by means of the optical pickup, the tilt driving section uses, as driving means, a stepping motor for changing the angle of the optical pickup with respect to the rotating surface of the optical disk and is provided with waveform shaping means for shaping a driving current waveform for driving the stepping motor. Thus, the optical disk driving apparatus according to the present invention has advantages in that it is possible to prevent the vibration of the optical pickup, to reduce disturbance derived from the vibration of the objective lens to focus control and tracking control and to suppress mechanical noise while tilt driving is being performed. Besides, the apparatus has further advantages in that since there is no need to provide a tilt sensor, the optical pickup can be made small in size and the smaller-sized optical disk driving apparatus can be, therefore, provided.

Furthermore, in the optical disk driving apparatus according to the present invention as stated above, the waveform shaping means smoothly shapes the driving current waveform rising from a central value to a maximum amplitude value and falling from the maximum value to the central value. Thus, the optical disk driving apparatus according to the present invention has advantages in that it is possible to smoothly rotate the stepping motor serving as the tilt motor and to thereby transmit the rotating force while the transmission means of the tilt driving section for transmitting the rotation of the stepping motor are not repelled against each other but kept in contact with each other.

Moreover, in the optical disk driving apparatus according to the present invention as stated above, the waveform shaping means constitutes a low pass filter. Thus, the optical disk driving apparatus according to the present invention has advantages in that it is possible to shut off the high frequency components of the step-like motor driving current waveform and to delay the rising and falling of the motor driving current waveform to thereby provide a smooth waveform with the simple configuration.

In an optical disk driving method according to the present invention, for changing the incidence angle of a light spot applied from an optical pickup with respect to the rotating surface of an optical disk so as to record and reproduce information in a tilt driving step by applying the light spot on the optical disk by means of the optical pickup, the tilt driving step comprises a waveform shaping step of shaping a driving current waveform driving a stepping motor, and a driving step of supplying the driving current waveform shaped in the waveform shaping step to the stepping motor serving as driving means and changing the angle of the optical pickup with respect to the rotating surface of the optical disk. Thus, the optical disk driving method according to the present invention has advantages in that it is possible to prevent the vibration of the optical pickup, to reduce disturbance derived from the vibration of the objective lens to focus control and tracking control and to suppress mechanical noise while tilt driving is being performed.

Further, in the optical disk driving method according to the present invention as stated above, the waveform shaping step is to smoothly shape the driving current waveform rising from a central value to a maximum amplitude value and falling from the maximum value to the central value. Thus, the optical disk driving method according to the present invention has advantages in that it is possible to smoothly rotate the stepping motor serving as the tilt motor and to thereby transmit the rotating force while the transmission means of the tilt driving step for transmitting the rotation of the stepping motor are not repelled against each other but kept in contact with each other.

Moreover, in the optical disk driving method according to the present invention as stated above, the waveform shaping step employs a low pass filter. Thus, the optical disk driving method according to the present invention has advantages in that it is possible to shut off the high frequency components of the step-like motor driving current waveform and to delay the rising and falling of the motor driving current waveform to thereby provide a smooth waveform with the simple configuration.

In an optical disk apparatus according to the present invention, for changing the incidence angle of a light spot applied from an optical pickup with respect to the rotating surface of an optical disk by means of a tilt driving section, applying the light spot onto the optical disk by means of the optical pickup and thereby recording and reproducing information, the tilt driving section uses, as driving means, a stepping motor for changing the angle of the optical pickup with respect to the rotating surface of the optical disk and is provided with waveform shaping means for shaping a driving current waveform driving the stepping motor. Thus, the optical disk apparatus according to the present invention has advantages in that it is possible to prevent the vibration of the optical pickup, to reduce disturbance derived from the vibration of the objective lens to focus control and tracking control and to suppress mechanical noise while tilt driving is being performed. Besides, the apparatus has advantages in that since there is no need to provide a tilt sensor, the optical pickup can be made small in size and therefore, the smaller-sized optical disk driving apparatus can be, provided.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An apparatus for use in driving an optical pick-up, said apparatus comprising a tilt driving section for altering an incidence angle of a light spot irradiated from said optical pickup onto a rotating surface of an optical disk in order to record information or reproduce information by irradiating the light spot on said optical disk by said optical pickup, wherein said tilt driving section is usable with a stepping motor as a driving means for altering the angle of said optical pickup with respect to the rotating surface of said optical disk, and has waveform shaping means for smoothing a waveform of a driving current for driving said stepping motor, and wherein a tilt middle point is determined by rotating the stepping motor in a first direction a first predetermined number of steps to insure that the stepping motor is at a first position which corresponds to a stop position, setting the first position as a reference position, and rotating the stepping motor in a second direction which is opposite to the first direction a second predetermined number of steps from said reference position to said tilt middle point.

2. An apparatus according to claim 1, wherein said waveform shaping means smoothes the waveform of said driving current so as to smoothen a rise from a central value to a maximum amplitude value and a fall from the maximum amplitude value to the central value.

3. An apparatus according to claim 1, wherein said waveform shaping means includes a low pass filter.

4. A method for use in driving an optical pick-up, said method comprising a tilt driving step for altering an incidence angle of a light spot irradiated from said optical pickup onto a rotating surface of an optical disk in order to record information or reproduce information by irradiating the light spot on the optical disk by the optical pickup, wherein the tilt driving step comprises a waveform shaping step of smoothing a waveform of a driving current for driving a stepping motor, and a driving step of supplying said driving current smoothed in said waveform shaping step to the stepping motor serving as driving means and altering the angle of said optical pickup with respect to the rotating surface of said optical disk, wherein a tilt middle point is determined by rotating the stepping motor in a first direction a first predetermined number of steps to insure that the stepping motor is at a first position which corresponds to a stop position, setting the first position as a reference position, and rotating the stepping motor in a second direction which is opposite to the first direction a second predetermined number of steps from said reference position to said tilt middle point.

5. A method according to claim 4, wherein said waveform shaping step smoothes the waveform of said driving current so as to smoothen a rise from a central value to a maximum amplitude value and a fall from the maximum amplitude value to the central value.

6. A method according to claim 4, wherein the waveform is smoothed in said waveform shaping step by use of a low pass filter.

7. An apparatus for use with an optical disk, said apparatus comprising:

an optical pick-up operable to provide a light spot onto a surface of said optical disk so as to record information thereto or reproduce information therefrom;

a stepping motor coupled to said optical pick-up; and a tilt driving section coupled to said stepping motor and operable to cause a drive current to be supplied to said stepping motor such that an incidence angle of the light spot provided by said optical pickup onto the surface of said optical disk is altered, said tilt driving section having a waveform shaping circuit operable to smooth a waveform of the drive current, wherein a tilt middle point is determined by rotating the stepping motor in a first direction a first predetermined number of steps to insure that the stepping motor is at a first position which corresponds to a stop position, setting the first position as a reference position, and rotating the stepping motor in a second direction which is opposite to the first direction a second predetermined number of steps from said reference position to said tilt middle point.

8. An apparatus according to claim 7, wherein said waveform shaping circuit includes a number of operational amplifiers and a number of inverter circuits each arranged in front of a respective operational amplifier.

* * * * *